(12) United States Patent
Maske et al.

(10) Patent No.: US 6,653,016 B2
(45) Date of Patent: Nov. 25, 2003

(54) EXTENDED TEMPERATURE OPERATING RANGE ELECTROCHEMICAL CELLS

(75) Inventors: Cecilia T. Maske, Middleton, WI (US); Gerald Sanden, Verona, WI (US); Zhihong Jin, Cottage Grove, WI (US); Patrick Spellman, Hayward, WI (US); Janna L. Rose, Oregon, WI (US)

(73) Assignee: Rayovac Corporation, Madison, WI (US)

( * ) Notice: Subject to any disclaimer, the term of this patent is extended or adjusted under 35 U.S.C. 154(b) by 180 days.

(21) Appl. No.: 09/840,752

(22) Filed: Apr. 23, 2001

(65) Prior Publication Data

US 2002/0106558 A1 Aug. 8, 2002

Related U.S. Application Data

(60) Provisional application No. 60/199,447, filed on Apr. 25, 2000.

(51) Int. Cl.[7] .................................................. H01M 2/02
(52) U.S. Cl. ........................ 429/165; 429/217; 429/232; 429/231.7; 29/623.5
(58) Field of Search ................................ 429/165, 217, 429/232, 231.7; 29/623.5

(56) References Cited

U.S. PATENT DOCUMENTS

| | | |
|---|---|---|
| 4,556,618 A | 12/1985 | Shia |
| 4,964,877 A | 10/1990 | Keister et al. |
| 5,114,811 A | 5/1992 | Ebel et al. |
| 5,298,349 A | 3/1994 | Takeuchi |
| 5,543,249 A | 8/1996 | Takeuchi et al. |
| 5,656,392 A | 8/1997 | Sano et al. |
| 5,716,728 A | 2/1998 | Smesko et al. |
| 5,814,419 A | 9/1998 | Kenyon et al. |
| 5,902,696 A | 5/1999 | Smesko et al. |
| 6,183,907 B1 | 2/2001 | Barusseau et al. |

FOREIGN PATENT DOCUMENTS

| | | | |
|---|---|---|---|
| JP | 53012031 | 2/1978 | |
| JP | 53058622 | 5/1978 | |
| JP | 54103512 | 8/1979 | |
| JP | 55043721 | 3/1980 | |
| JP | 58068877 | 4/1983 | |
| JP | 59083354 | 5/1984 | |
| JP | 60025159 | 2/1985 | |
| JP | 62274568 | 11/1987 | |
| JP | 62274569 | * 11/1987 | ............ H01M/2/02 |
| JP | 02177254 | 10/1990 | |

* cited by examiner

*Primary Examiner*—Carol Chaney
*Assistant Examiner*—Angela J. Martin
(74) *Attorney, Agent, or Firm*—Quarles & Brady LLP

(57) ABSTRACT

An electrochemical cell having a cell can that includes an interior surface, a current collector, a solid cathode contained in the can and in conductive contact therewith, an organic or solid polymer electrolyte comprising lithium salt solutes and aprotic organic solvents has improved storage properties when a coating comprising carbon powder is diposed on the current collector surface and on the adjacent interior surface of the cell can. Further, the cell has advantageous enhanced discharge properties over an expanded temperature range when the cathode additionally comprises a fluoropolymer resin binder.

19 Claims, 9 Drawing Sheets

Impedance Maintenance @110C

EXTENDED TEMPERATURE OPERATING RANGE ELECTROCHEMICAL CELLS

CROSS-REFERENCE TO RELATED APPLICATIONS

This application claims the benefit of provisional patent application No. 60/199,447 filed Apr. 25, 2000, which is incorporated by reference in its entirety as if fully set forth herein.

STATEMENT REGARDING FEDERALLY SPONSORED RESEARCH OR DEVELOPMENT

Not Applicable.

BACKGROUND OF THE INVENTION

The present invention relates to electrochemical cells. In particular, the present invention relates generally to small electrochemical cells having solid cathodes, organic or solid polymer electrolytes comprising lithium salt solutes and aprotic, organic solvents. In a preferred aspect, this invention relates to lithium/graphite fluoride, especially lithium/carbon monofluoride electrochemical cells. While various electrochemical cell configurations are contemplated by the present invention, its primary application is coin cells or button cells.

It has long been a desire of the battery industry to have a very reliable, high rate performance, low impedance, high flash amperage electrochemical cell or battery that is capable of being stored and subsequently operated at a very wide range of temperatures. One of the electrochemical cell chemistries that have held great promise to meet that desire has been that of lithium graphite fluoride $Li/(CF)_n$. A preferred form of the graphite fluoride cell chemistry is carbon monofluoride ($Li/CF_x$). Lithium carbon monofluoride cells generally comprise a lithium anode, carbon monofluoride cathodes and a non-aqueous or organic electrolyte which generally includes a lithium salt.

Commonly owned U.S. Pat. No. 5,246,795 to Megahed et al. discloses a $Li/CF_x$ electrochemical cell which is structurally adapted for high temperature storage and use. Unfortunately, when stored and used at even wider temperature ranges, prior art $Li/CF_x$ electrochemical cell systems have not performed adequately, especially at low temperature. Specifically, after being exposed to temperatures in the range of −40° C. to 110° C. for long periods of time, the $Li/CF_X$ cells tend to provide insufficient current when called upon to do so e.g., by a remote tire pressure monitor interrogation system. Various other battery applications requiring such a wide operating temperature range would experience similarly suboptimal performance.

Accordingly, it is an object of the present invention to provide an electrochemical cell which may be stored and/or used for extended periods at a very wide range of temperatures.

It is a further object of this invention to provide a lithium graphite fluoride cell, especially a lithium carbon monofluoride electrochemical cell, which can be stored for lengthy periods of time even at relatively high temperatures and which is capable of delivering pulse currents of substantially greater amperage than previous systems.

It is yet a further object of the present invention is to provide a lithium solid cathode cell which can be produced according to known manufacturing techniques.

The above objects of the present invention will be more fully understood, and further objects and advantages will become apparent, from the following description of the invention.

SUMMARY OF THE INVENTION

Briefly, in one aspect, the present invention is an negative active material/organic electrolyte/active material cathode electrochemical cell which can be stored for long periods of time, at a wide range of temperatures, and which can deliver a surprisingly high flash amperage or pulse current. Anode materials generally comprise alkali metals and alkaline earth metals which are more completely described below. Cathode materials include, without limitation, graphite fluoride, carbon monofluoride, $MnO_2$, CuS, $FeS_2$ and include mixed cathode chemistries. Numerous other positive active material chemistries will occur to one skilled in this art in light of the present disclosure.

Thus, in one aspect, the present invention is a negative active material, organic electrolyte, positive active material electrochemical cell in which the cathode current collector surface and the adjacent cell can interior surface which are in conductive association with the cathode active material are substantially completely covered with a coating or layer comprising carbon powder. Generally speaking a carbon powder coating of this invention will include an adhesion-enhancing or promoting composition to enhance the adhesion between carbon coating and the current collector and adjacent cell can. Preferred adhesion promoters or binders of this invention are sodium silicate and potassium silicate.

In a further aspect, the present invention comprises an alkali metal/organic electrolyte/graphite fluoride electrochemical cell or battery, (especially a carbon monofluoride cell), in which the cathode current collector surface and adjacent cell can interior surface which are in conductive association or contact with the cathode active material are substantially completely covered with an adherent coating or layer comprising carbon powder.

In still a further aspect, the present invention includes an agent for counteracting an increase in internal impedance during short term high temperature storage and for improving low temperature high-rate pulse performance of a cell. By preventing the impedance from rising, the cells are able to operate at lower temperature, since any accompanying change in impedance does not rise to an unacceptable level.

In yet a further aspect, the present invention comprises a $lithium/CF_x$ electrochemical cell utilizing a carbon coated cathode current collector and can as is described above in which the cathode binder comprises all or substantially all fluoropolymer resin. Carbon powder coating (paint) containing silicate can confer improved corrosion resistance upon the cell. Corrosion resistance is particularly desirable in cells that contain fluoropolymer binder in the cathode, because the binder can increase corrosion in lithium cells after storage, notwithstanding the binder's ability to confer improved high rate performance. Even without fluoropolymer binder in the cathode, the coating of the invention improves long term cell storage.

Yet a further aspect this invention is a method of making alkali metal or alkaline earth metal/$(CF)_n$ electrochemical cells, particularly $Li/CF_X$ cells, which can be stored at temperatures of as high as 110° C. for many days and which can subsequently be discharged at a high pulse rate even at temperatures as low as −40° C. Numerous other applications for the present invention will occur to one skilled in this art in light of the present disclosure taken in conjunction with the accompanying drawings.

DETAILED DESCRIPTION OF THE INVENTION

As is noted above, the present invention is believed to be widely applicable to many types of cell chemistries. It is to be further understood that the present invention is believed to be applicable to various known cell configurations such as spiral wound and round cells. For purposes of illustration and not for purposes of limitation, the present invention will be described in terms of lithium/carbon monofluoride button cells. It is to be understood however, that the present invention is broadly applicable and should not be limited by the description of the preferred embodiments.

Figure 1:
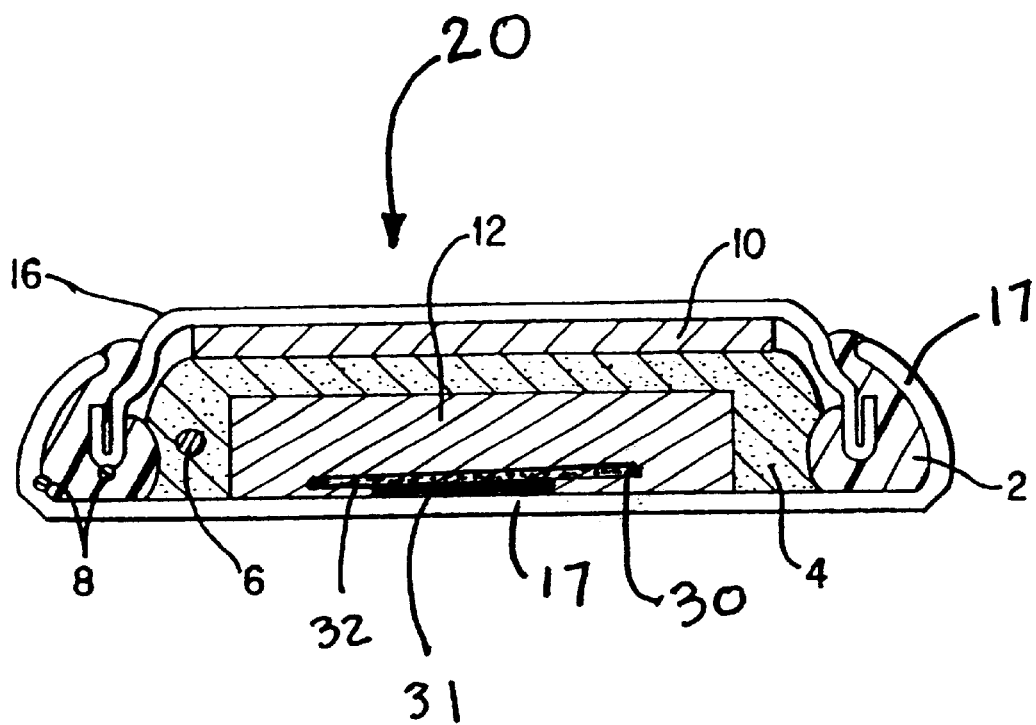
FIG. 1 shows in section the construction of a lithium carbon monofluoride electrochemical cell of the present invention.

Thus there is shown in FIG. 1, in section, an electrochemical cell or battery 20 of the present invention. Battery 20 comprises an anode 10, a $CF_x$ cathode 12, a separator 4 having electrolyte 6 therein, an anode cap 16, and a cell can 17. Electrolyte 6 provides an ionic pathway between anode 10 and cathode 12 and therefor permeates separator 4. Gasket 2 substantially seals the anode cap 16 to the cell can 17 (after the cap and can are crimped together) to prevent loss of electrolyte.

The electrochemical cell of the present invention generally comprises an anode 10 of a metal selected from Groups IA, IIA and IIIB of the Periodic Table of the Elements, including lithium, sodium, potassium, etc., and their alloys and intermetallic compounds including, for example, Li—Si, Li—Al, Li—B, Li—Mg, and Li—Si—B. Metal intercalated carbon or graphite materials such as lithiated carbon are also within the contemplation of the present invention. The preferred anode comprises lithium. An alternate anode comprises a lithium alloy such as a lithium-aluminum alloy. The greater the amount of aluminum present by weight in the alloy, however, the lower the energy density of the cell.

The form of the anode may vary, but preferably the anode is a thin metal sheet or foil of the anode metal having a circular or "coin" shape. The anode material is preferably pressed or rolled directly onto the anode cap (16 in FIG. 1). Anode caps, such as the one illustrated generally comprise stainless steel, aluminum, titanium, titanium alloys or nickel.

Copper, tungsten and tantalum are also suitable. The anode may be formed in other geometries, such as a bobbin shape, cylinder or pellet. Numerous other such geometries will occur to one skilled in the art depending upon the intended application.

An electrochemical cell of the present invention further comprises a cathode 12 of electronically conductive material which serves as the other electrode of the cell. The electrochemical reaction at the cathode involves conversion of atoms which migrate from the anode to the cathode into ionic or molecular forms. The cathode of the present invention preferably comprises a solid active material such as fluorinated carbon represented by the formula $(C_2F)_n$ and $(CF_x)_n$ wherein x varies between about 0.1 to 1.9 and preferably between about 0.5 and 1.4 and most preferably about 0.9 to about 1.2 and "n" is the number of repeating monomer units which can vary widely. Mixed cathode materials, i.e., $MnO_2/CF_x$ mixtures of from 1 to 99 mole %, are also contemplated by the present invention.

Before fabrication into an electrode for incorporation into an electrochemical cell, the fluorinated carbon active material is preferably mixed with a conductivity enhancer or conductive additive. Suitable conductive additives include acetylene black, carbon black and/or graphite. Metals such as nickel, aluminum, titanium and stainless steel in powder form are also useful as conductive diluents when mixed with the above listed active materials. Composite conductive powders, i.e., composites of conductive and non-conductive materials, may be used, particularly when cost considerations are particularly important.

A cathode of the present invention further comprises a binder material. Hydrocarbon-based cathode binder materials such as polypropylene, polyethylene (usually powder), styrene-butadiene rubber (SBR), and are contemplated by the present invention, Cathode binders of this invention preferably comprise a fluoropolymer resin. Fluoro-resin powder such as powdered polytetrafluoroethylene (PTFE) or powdered polyvinylidene fluoride (PVDF) are typical examples of binder materials which comprise the cathode. A particularly preferred cathode fluoropolymer resin binder material is Teflon® PTFE 30 fluoropolymer resin aqueous dispersion commercially available from E.I. du Pont de Nemours & Company in Wilmington, Del., U.S.A (hereafter referred to as "T-30"). T-30 is incorporated into a cathode of this invention in accordance with the method described below. A preferred cathode active mixture comprises $CF_x$ combined with acetylene black and/or graphite conductivity additives and T-30. Other fibrillatable fluoropolymer resins are also suitable binders in cathodes of the invention.

The cathode of the present invention can further comprise an agent for counteracting an increase in internal impedance during short term high temperature storage and improving low temperature high-rate pulse performance of a cell. A preferred agent is a silicate of an alkali metal or of an alkaline earth metal, more preferably a sodium silicate, a potassium silicate, a lithium silicate and an aluminum silicate (zeolite). Most preferred are sodium silicate and potassium silicate. Carbon paint that contains a silicate can be added to the cathode to achieve the desired effect. The optional additive can be included in the cathode in an amount between about 0.01% and 10% by weight of the cathode, and is preferably added in an amount between about 0.05% and 5%, and most preferably at about 1% to 3%. Still more preferably, the cathode includes both the silicate agent and a fluoro-resin powder.

Cathode components for incorporation into the cell may be prepared by rolling, spreading, pelletizing, or pressing the cathode active mixture of the present invention onto a suitable current collector selected from the group consisting of ferrous alloys, aluminum, aluminum alloys, stainless steel, titanium, tantalum, platinum and gold. The preferred current collector material is titanium. An aluminum foil current collector exhibited even lower impedence than a titanium current collector after shelf storage for a month or more at 110° C. when the cathode included a fluoro-resin powder such as T-30. Preferably a cathode current collector of this invention has a layer or coating of graphite/carbon paint applied thereto. The graphite/carbon paint can protect the current collector from oxidation and can maintain performance after cell storage. A preferred graphite/carbon paint is sold under the trade designation Varniphite IV-96 and is commercially available from the Mihon Kokuen Company of Japan. Vamiphite IV-96 carbon paint is an aqueous graphite dispersion. Other such graphite dispersions, especially aqueous dispersions using an inorganic binder such as sodium silicate or potassium silicate binder, or carbon paints will be known to one skilled in this art. Other organic or inorganic binder materials which enhance the electronic contact between the cathode material and the current collector/cathode-material-contacting interior can surface having carbon paint thereon may be included in the carbon paint composition.

U.S. Pat. No. 5,716,728 suggests (at column 3 line 33 et. seq.) that it is desirable to apply a thin layer of graphite/carbon paint to the cathode current collector. Surprisingly and unexpectedly it has been found that not only should the cathode current collector have a layer or coating of carbon powder or carbon paint applied thereto, but that the entire cell can surface adjacent the current collector and exposed to the cathode material also should have a layer of carbon paint thereon. In fact to take optimal advantage of this invention, the current collector shape may be chosen so that more of the cell can carbon painted surface or area is exposed and in conductive contact with the cathode material. The carbon paint is preferably applied to a thickness whereby substantially no pinholes are visible in the paint layer upon SEM examination. The current collector and adjacent cell can surface should be covered. It will be understood that the thickness of the paint layer can be varied by adjusting the density of the applied paint.

Figure 2:
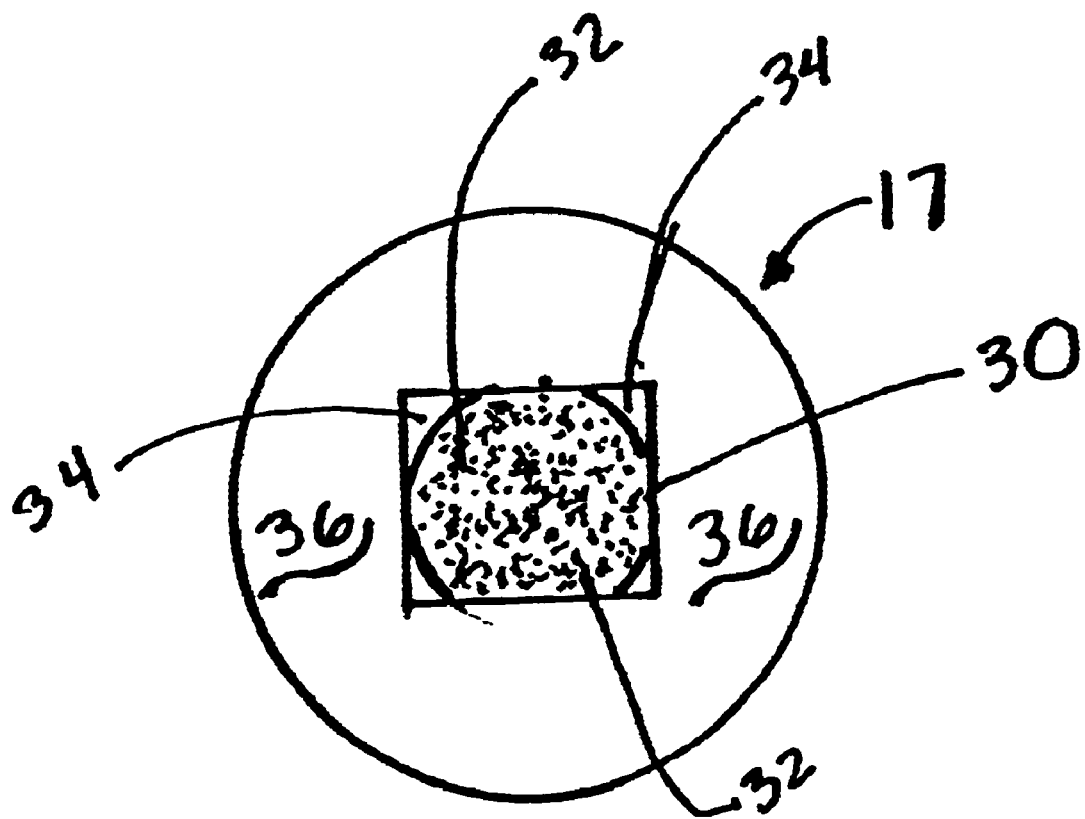
FIG. 2 is a top view of a cell can of a prior art electrochemical cell.

Thus there is shown in FIG. 2 a top view of a prior art cell can/current collector configuration as is suggested in the aforementioned U.S. Pat. No. 5,716,728 patent and is believed to have been used elsewhere in the prior art. Cell can 17 has therein a substantially square current collector 30. Current collector 30 is attached to cell can interior bottom 36 in accordance with techniques known to the art such as by spot weld 31 (not shown in FIG. 2 but shown in FIG. 1). As is known in the art, current collector 30 is partially coated with a thin layer of carbon paint 32 (indicated by stippling). In the embodiment shown, current collector 30 has been painted with carbon or graphite paint in a substantially circular configuration leaving areas 34 of current collector 30 which have no carbon paint thereon. In addition, the interior bottom 36 of cell can 17 which contacts the cathode material is also devoid of carbon paint.

Figure 3:
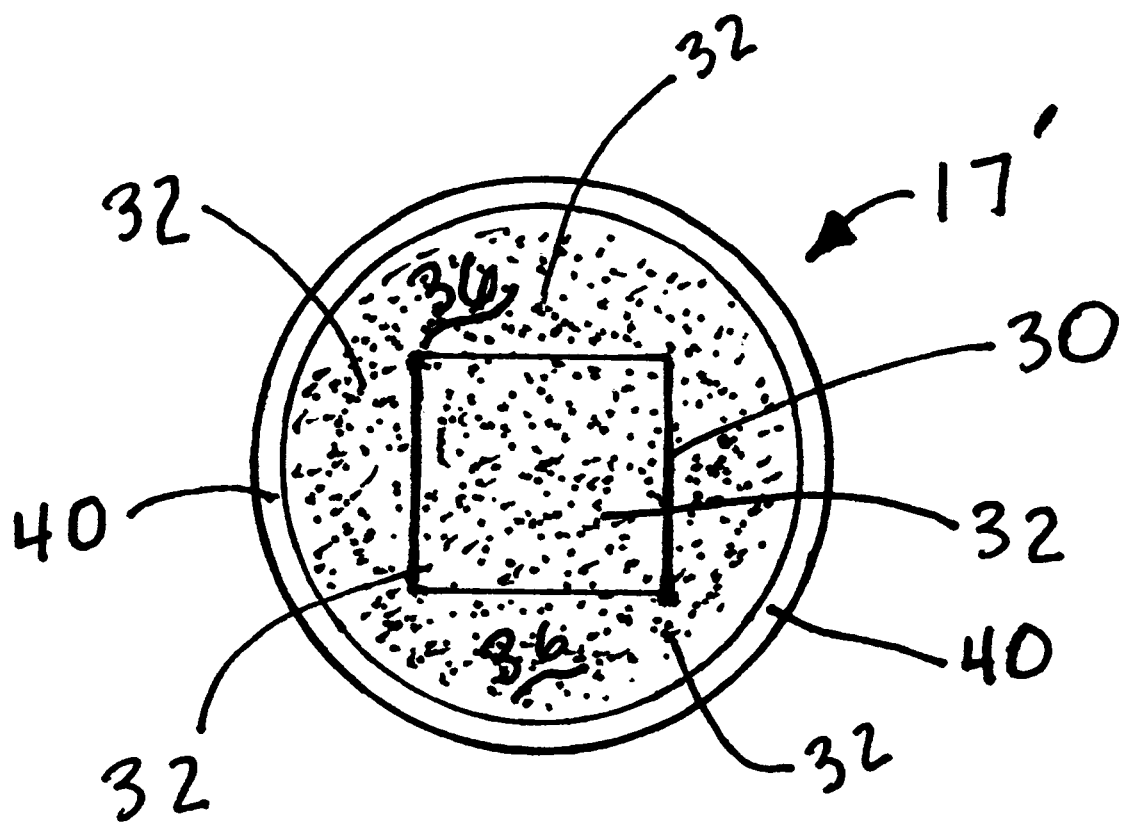
FIG. 3 is a top view of a cell can of an electrochemical cell of this invention.

A preferred embodiment of the present invention is shown in FIG. 3. In FIG. 3 there is shown a top view of a cell can 17'. As is shown, the entire surface of current collector 30 is coated with carbon paint 32 (also shown by stippling). In addition, substantially the entire interior surface 36 of the cell can 17' which contacts the cathode material and which is adjacent current collector 30 also is coated with carbon paint 32. An unpainted border 40 is shown. Border 40 substantially corresponds to the location of gasket 2 when the cell is assembled (shown in FIG. 1) and thus would not in any event provide an electrically conductive pathway between the cathode material and the cell can surface.

Figure 4:
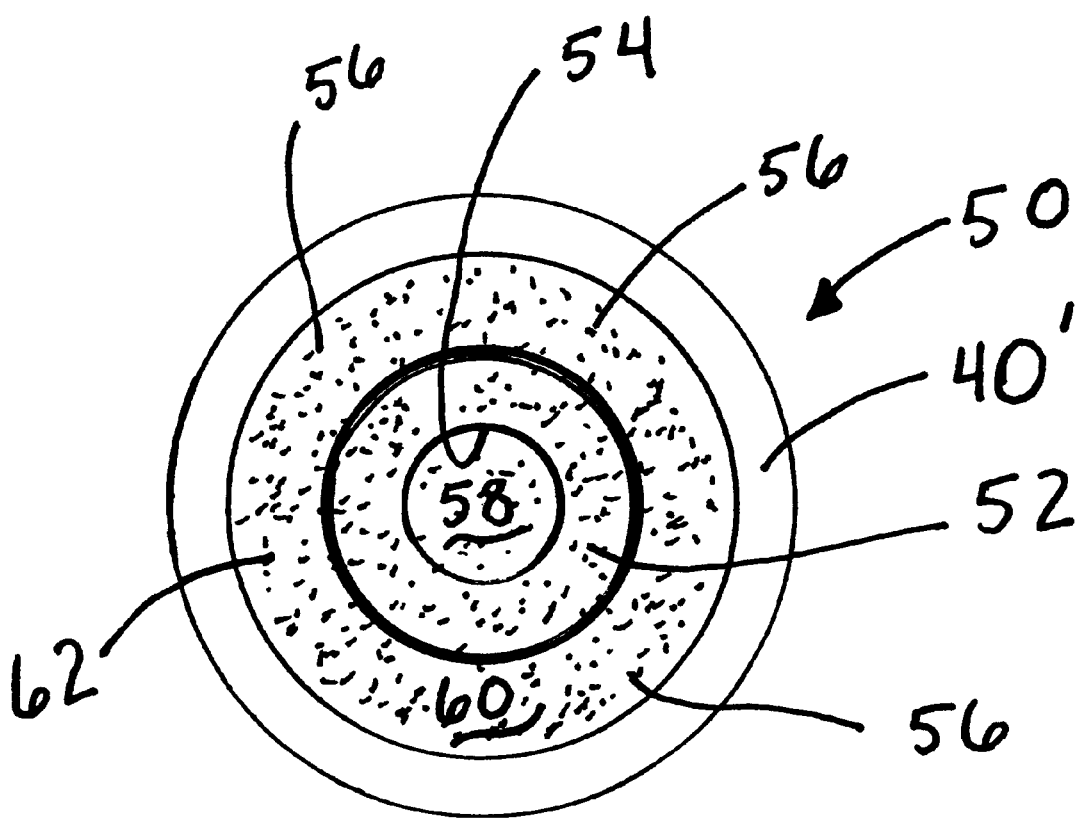
FIG. 4 is a top view of another embodiment of the present invention.

FIG. 4 shows a further embodiment of the invention 50 in which a circular cathode current collector 52 defining a central space 54 is employed. Circular current collector 52 is itself coated with carbon paint or carbon powder (shown by stippling 56) as are the central and peripheral areas 58 and 60, respectively, of cell can interior bottom 62. The carbon powder or the carbon in the paint is preferably graphite. Other cathode current collector geometries, e.g., square, rectangular, or triangular, are within the scope of this invention. Other such cathode current collector geometries optionally may utilize an interior space such as that shown at 54 in FIG. 3.

Cathodes prepared as described above are usually in the form of one or more cathode plates or "cakes" operatively associated (i.e., in ionically conductive association) with at least one or more plates of anode material. Other configurations will readily occur to one skilled in this area in view of the present disclosure.

In order to prevent internal short circuit conditions, the cathode is separated from the Group IA, IIA or IIIB anode material by a suitable separator 4 (FIG. 1). The separator is of electrically insulative material, and is chemically nonreactive with the anode and cathode active materials. The separator also is nonreactive with, and insoluble in, the electrolyte. In addition, the separator material has a degree of porosity sufficient to allow flow therethrough of the electrolyte during the electrochemical reaction of the electrochemical cell. Illustrative separator materials include non-woven polypropylene, polyethylene and glass, and fabrics woven from fluoropolymeric fibers including polyvinylidine fluoride, polyethylenetetrafluoroethylene, and polyethylenechlorotrifluoroethylene used either alone or laminated with a fluoropolymeric microporous film, non-woven glass, polypropylene, polyethylene, glass fiber materials, ceramics, polytetrafluoroethylene membrane commercially available under the designation ZITEX (Chemplast Inc.), polypropylene membrane commercially available under the designation CELGARD (Celanese Plastic Company, Inc.) and a membrane commercially available under the designation DEXIGLAS (C.H. Dexter, Div., Dexter Corp.).

A preferred separator comprises a non-woven polypropylene separator, preferably having one or more layers. A preferred separator is this invention has two such layers.

The electrochemical cell of the present invention further includes a nonaqueous, ionically conductive electrolyte which serves as a medium for migration of ions between the anode and the cathode electrodes during the electrochemical reaction of the cell. The electrochemical reaction at the electrodes involves conversion of the negative active material in atomic or molecular forms which migrate from the anode to the cathode to ions. Thus, nonaqueous electrolytes suitable for the present invention are substantially inert to the anode and cathode materials, and they exhibit those physical properties necessary for ionic transport, namely, low viscosity, low surface tension and wettability.

A suitable electrolyte comprises an inorganic, ionically conductive salt dissolved in a nonaqueous solvent. Salts of Group I-A, II-A, and III-A of the Periodic Table of the Elements are most commonly used. More preferably, the electrolyte includes an ionizable alkali metal or alkaline earth metal salt dissolved in a mixture of aprotic, organic solvents comprising a low viscosity solvent and a high permittivity solvent. The electrolyte serves as the vehicle for migration of the anode species to intercalate or react with the cathode active material. Preferably the ionforming alkali metal salt is similar to the alkali metal comprising the anode.

In a solid cathode/electrolyte system, the ionically conductive salt preferably has the general formula MM'F$_6$ or MM'F$_4$ wherein M is an element selected from the group consisting of phosphorous, arsenic, antimony and boron. Examples of salts yielding M'F$_6$ are: hexafluorophosphate (PF$_6$), hexafluoroarsenate (AsF$_6$) and hexafluoroantimonate (SbF$_6$) while tetrafluoroborate (BF$_4$) is exemplary of salts yielding M'F$_4$. Alternatively, the corresponding sodium or potassium salts may be used. If desired, a secondary salt containing the perchlorate anion such as lithium perchlorate (LiClO$_4$) and tetrabutyl ammonium perchlorate (NCH$_3$(CH2)$_3$ClO$_4$) is added to the electrolyte. Other salts useful in the practice of the present invention include LiAlCl$_4$, LiGaCl$_4$, LiC(SO$_2$CF$_3$)$_3$, $_{LiN}$(SO$_2$CF$_3$)$_2$, LiSO$_3$F, LiB(C$_6$H$_5$)$_4$ and LiCF$_3$SO$_3$, and mixtures thereof.

Low viscosity solvents useful with the present invention include esters, linear and cyclic ethers and dialkyl carbonates such as tetrahydrofuran (THF), methyl acetate (MA), diglyme, trigylme, tetragylme, dimethyl carbonate (DMC), 1,2-dimethoxyethane (DME), diethyl carbonate and mixtures thereof, and high permittivity solvents include cyclic carbonates, cyclic esters and cyclic amides such as propylene carbonate (PC), ethylene carbonate (EC), acetonitrile, dimethyl sulfoxide, dimethyl formamide, dimethyl acetamide, —valerolactone, —butyrolactone (GBL) and N-methyl-pyrrolidinone (NMP) and mixtures thereof. In the present invention, the preferred anode is lithium metal and the preferred electrolyte is 0.5 M to 1.4 M LiBF$_4$ in a 50/50/mixture of propylene carbonate and 1,2 dimethoxyethane.

The present invention will now be illustrated by the following examples which should be interpreted as illustrative and not limiting of the invention. Many variations of the present invention will be suggested to one skilled in the art in view of the disclosure.

EXAMPLE I

An electrochemical cell have a structure substantially similar to that shown in U.S. Pat. No. 5,246,795 was constructed in accordance with known assembly processes with the exceptions herein described. A 2335 size coin cell configuration was used. Prior to assembling the completed cell by crimping together the cell anode cap and cell can, in accordance with this invention, the cathode current collector and the interior of the cathode can surrounding and adjacent the cathode current collector and which contacts the cathode material were coated (e.g., by hand painting) with Vamiphite IV-96 aqueous dispersion carbon paint. The Varniphite 1 V-96 graphite paint is a black aqueous fluid having about 25% to about 45% solids (including the binder). The carbon paint then was dried on the current collector and heating the painted assembly for a time period of 12 hours at a temperature of 150° C. The dried carbon paint density was approximately 0.158 mg/mm$^3$. Coating surface densities in the range of about 0.02 mg/mm$^2$ to about 0.5 mg/mm$^2$, preferably about 0.05 mg/mm$^2$ to about 0.25 mg/mm$^2$ have been found to achieve the surprising and unexpected results of this invention. The dried carbon paint thickness is advantageously in the range of 0.03 mm to 0.1 mm. Cell design has some affect upon the carbon paint density used. Generally for a BR 2335 cell according to the invention, it has been found that the total amount of carbon paint needed to coat the current collector and adjacent interior can surfaces which contact the cathode material falls in the range of about 60 to 120 mg/cell. The carbon paint surface density can range between about 0.2 and 0.45 mg/mm$^2$ and typically comprises between about 30% and 38% solids. The resulting cell appeared substantially as the cell shown in FIG. 3. The cathode used had a diameter of 17.3 mm, a thickness of 1.58 mm, and a weight of 0.470 mg. A 85.6 mg coin-shaped lithium anode having a thickness of 0.63 mm and a diameter of 18 mm was used. The cathode composition comprised 5% by weight T-30, 9.5% by weight acetylene black and 85.5% by weight CF$_x$, x having a value in the range of 0.9 to 1.2. A 304 stainless steel cell can top, a 444 stainless steel cathode can completed the structure The cell then was assembled as is described above. A titanium cathode current collector was used.

EXAMPLES 2–3

Cells described in accordance with Example 1 were assembled to coin cell size configurations conventionally referred to as 1225 and 1632.

EXAMPLE 4

For purposes of comparison, cells as described in Examples 1–3 above were tested against conventional cells as follows:

a. Single coat of carbon paint only on current collector;
b. Two coats of carbon paint only on current collector;
c. Carbon painted can and current collector in accordance with the invention;
d. Uncoated cathode current collector, T30 fluorocarbon binder employed;
e. Uncoated cathode current collector, SBR hydrocarbon binder employed.

Figure 5:
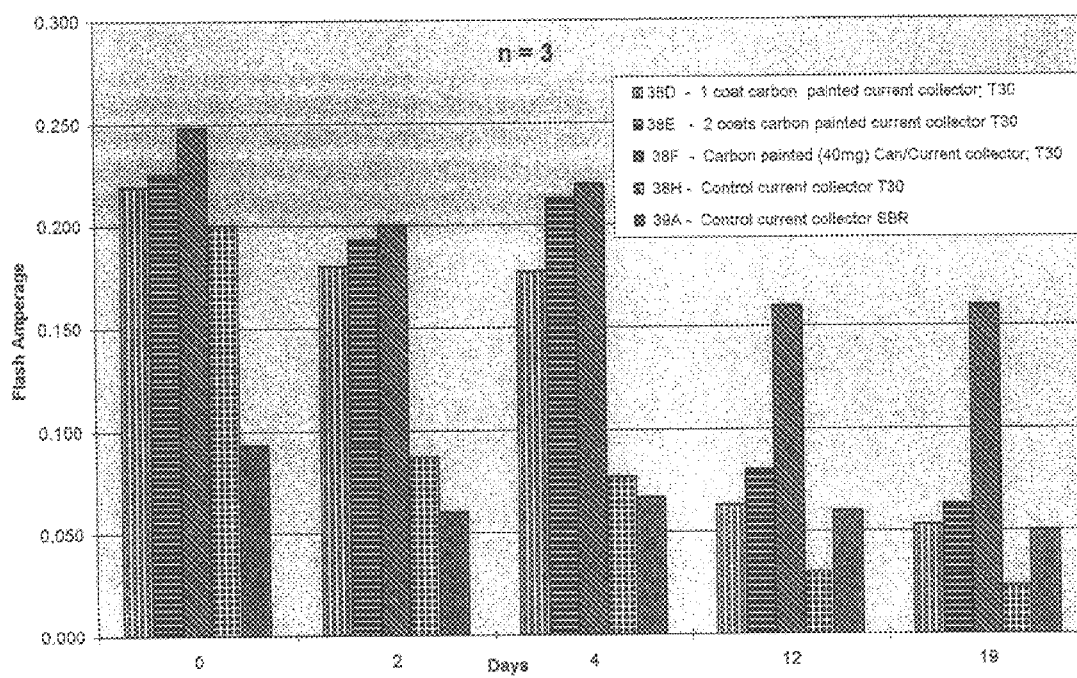
FIG. 5 is a summary of the Average Flash Amperage Analysis after storage at 110° C. of the cells assembled in Examples 1–3, the measurements being described in Example 4.

The resulting cells then were stored at 110° C. for up to 20 days. Periodically during the high temperature storage period the average flash amperage of 3 cells in each of the 5 cell configurations was measured. The results of that evaluation (averages for n=3) is shown in FIG. 5. In FIG. 5 the letters across the bottom of the horizontal axis correspond to the 5 cell configurations a.–e. above. As is clearly demonstrated in FIG. 5, the cells having the carbon paint coating on the cathode current collector and the adjacent can (cells "c." above) evidenced an extremely stable and reliable average flash amperage even when stored at a temperature of 110° C. for up to 19 days.

EXAMPLE 5

Figure 6:
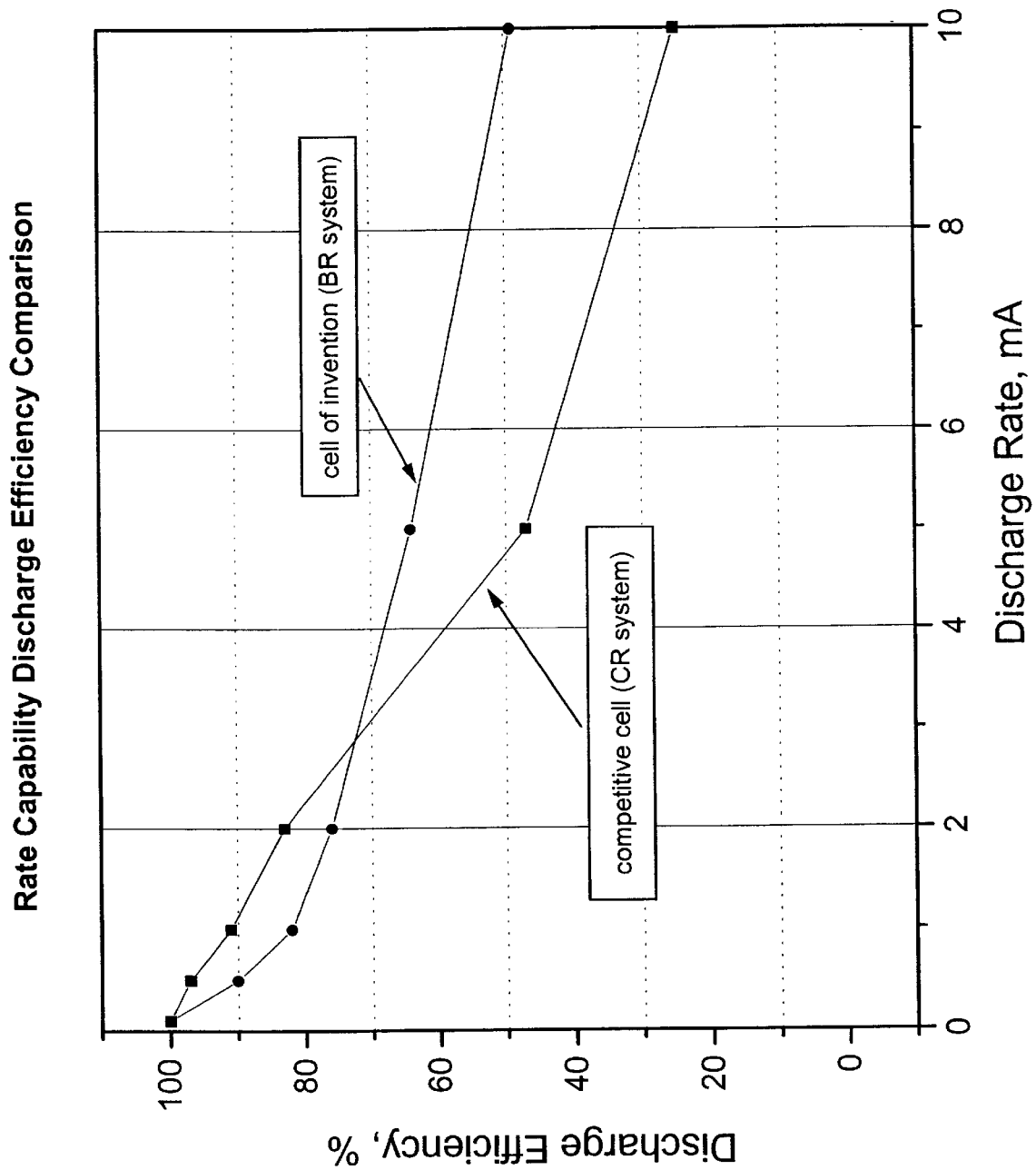
FIG. 6 depicts the discharge efficiency data obtained in Example 5.

A rate capability discharge efficiency comparison was run between an electrochemical cell in accordance with this invention (size BR 2335) and commercially available CR2450 size cells. The commercial cells had a screen construction cathode current collector that was completely coated with carbon powder but had no carbon powder on the adjacent interior can surfaces. The results of that comparison are shown in FIG. 6. The data shown in FIG. 6 was collected based upon total capacity to a 2.0 volt end point at various drains from 0.1 mA to 10 mA. As is shown in FIG. 6, the discharge efficiency of the cells of this invention is substantially greater than the discharge efficiency of the commercial cells, especially for discharge rates in excess of about 3 mA.

EXAMPLE 6

Figure 7:
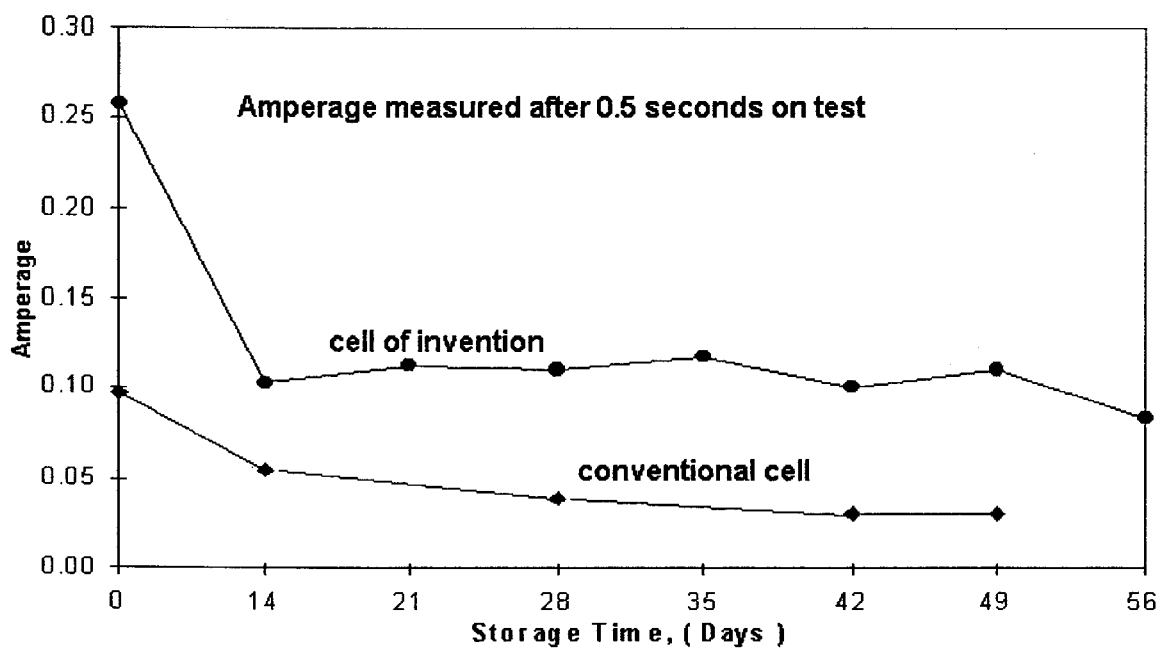
FIG. 7 depicts the amperage maintenance data obtained in Example 6.

Amperage maintenance of cells of the invention was measured in comparison with comparably sized conventional cells. Amperages were measured at 1000 Hz after 0.5 second on test, the cells being stored for about 2 months at 110° C. The results of that comparison are shown in FIG. 7. Data indicated by circles are the invention.

EXAMPLE 7

Figure 8:
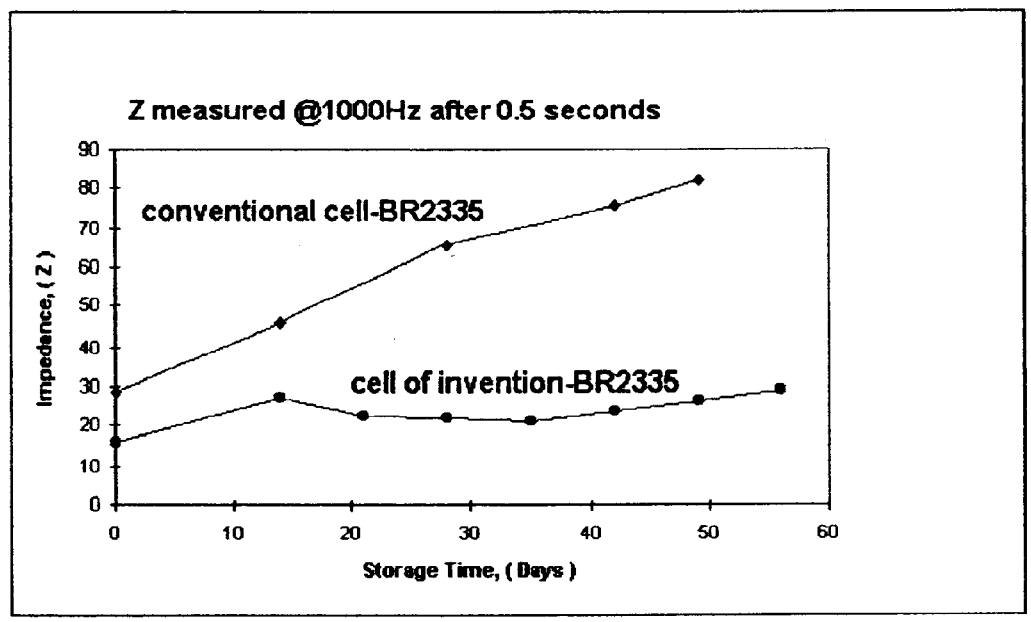
FIG. 8 depicts the cell impedance data obtained measured in Example 7.

Impedance maintenance was measured for the same sets of cells as used to obtain the data in FIG. 7. The results of that evaluation are shown in FIG. 8. The circles illustrate data of the invention.

By way of further example, the initial impedance of a conventional BR 3225 cell measured at 1000 Hz after 0.5 seconds is about 30, while BR cells containing a Teflon T-30 binder according to the invention had an impedance of between 15 and 20. A BR cell further containing a silicate additive had a slightly lower impedance of about 15. Likewise, a 40% lower initial impedance was also observed in BR1225 cells containing a Teflon T-30 binder relative to conventional cells.

EXAMPLE 8

Figure 9:
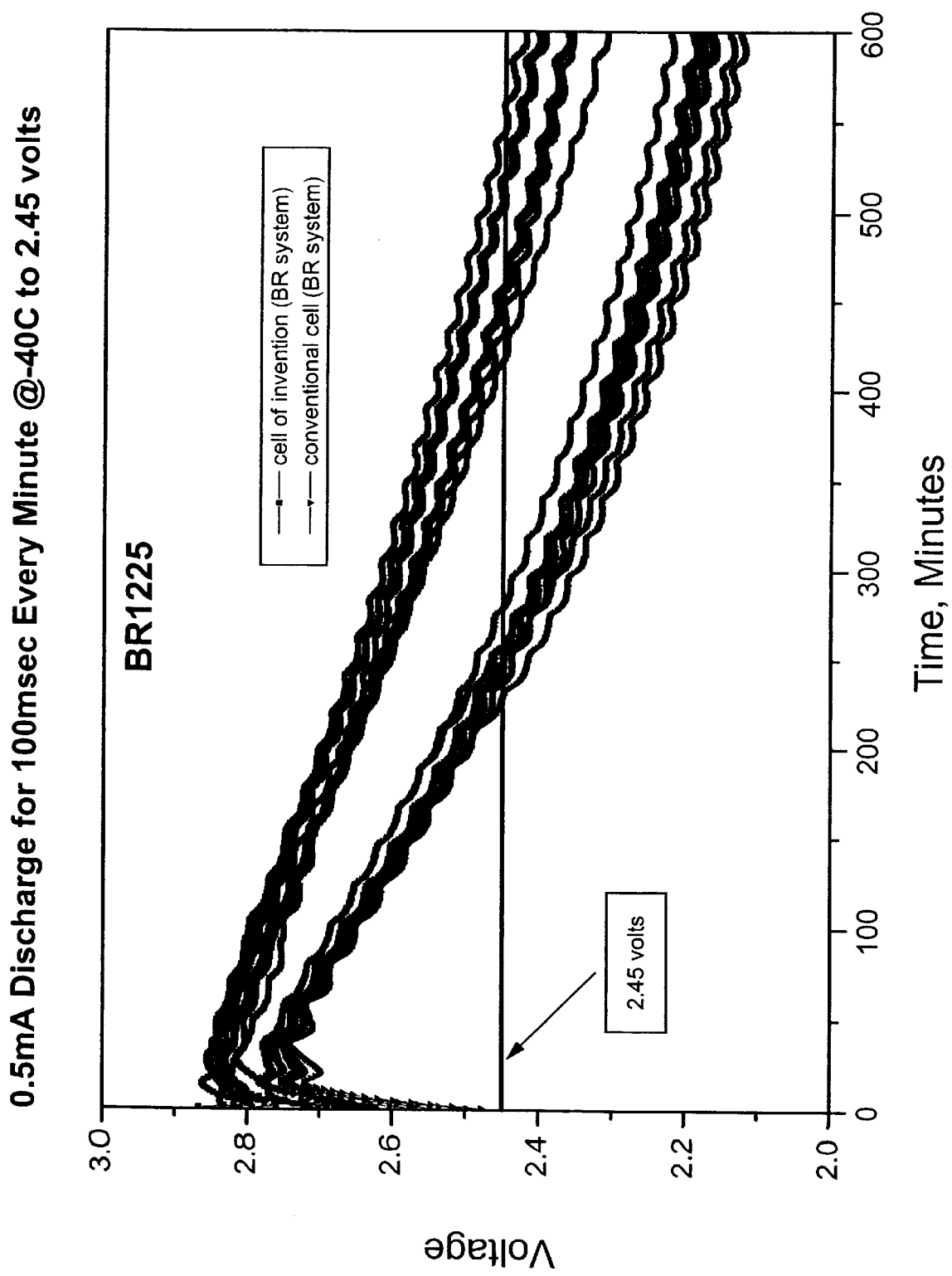
FIG. 9 depicts the pulse test comparison data obtained in Example 8.

A low temperature (−40° C.) pulse test comparison was run using two sets of cells of the present invention and a set of conventional cells (1225-size). The cells were discharged at −40° C. to an end point voltage of 2.45 using 0.5 mA pulses for 100 msec each minute (59.9-second recovery time). The results of that evaluation are shown in FIG. 9. It is abundantly clear from FIG. 9 that the pulse test performance of the cells of this invention was dramatically better initially and continued for a much longer period of time than the performance of conventional cells.

Comparable tests at −40° C. using 1632- and 2335-size cells discharged to 2.1 V in the same manner at discharge rates of 1–5 mA or 2.5–10 mA consistently showed the same pattern of improved discharge capability relative to control cells lacking the T-30 binder and improved carbon paint of the invention. For example, at 10 mA discharge, the time to 2.1 V was more than 4 times greater for 2335-size cells of the invention than for the control cells.

EXAMPLE 9

Cells containing various amounts of Teflon T-30 binder were compared in a pulse performance test (minutes to 2.1 V cut off after 10 mA 100 msec/15 sec pulse at −40° C., before and after storage for 24 hours at 110° C., n=5). The tested cells were BR2335 cells. The cathode density was 1.27 g/cc. As shown in Table 1, improved pulse performance is generally observed when the binder is added in an amount below 5% by weight. It was also observed that it is preferred to maximize the amount of conductive additive (here, acetylene black) up to the point at which the cathode cake strength is not acceptance for use in a cell. Cathode cake strength can be measured with a Chatillon DFM50 force gauge Cake strength increased with increasing percentage of Teflon T-30.

TABLE 1

| CFx | Acetylene Black | Teflon | Pulse Average |
|---|---|---|---|
| 87.75% | 9.50% | 2.75% | 15 ± 2 |
| 85.50% (control) | 9.50% | 5.00% | 17 ± 0 |
| 90.00% | 9.50% | 0.50% | 21 ± 2 |
| 86.25% | 10.25% | 3.50% | 21 ± 1 |
| 87.75% | 11.75% | 0.50% | 24 ± 4 |
| 86.25% | 12.50% | 1.25% | 25 ± 4 |
| 88.50% | 10.25% | 1.25% | 29 ± 1 |
| 87.00% | 11.00% | 2.00% | 29 ± 1 |
| 85.50% | 11.75% | 2.75% | 31 ± 2 |
| 85.50% | 14.00% | 0.50% | 33 ± 7 |

EXAMPLE 10

Cells having various cathode densities and containing various cathode additives were compared in a pulse performance test (minutes to 2.1 V cut off after 10 mA 100 msec/15 sec pulse at −40° C., before and after storage for 24 hours at 110° C., n=5). As shown in Table 2 (cathode density 1.27) and in Table 3 (cathode density 1.37), the low temperature pulse performance of control cells worsens after the storage period. However, cells containing either extra carbon paint on the can or containing any of the indicated cathode additives maintain excellent low temperature performance after the storage.

TABLE 2

| Cathode additives | CFx % | Acet. Bk. % | Teflon % | Carbon paint Wt on can | Initial | After 24 hr 110° C. |
|---|---|---|---|---|---|---|
| No additive (control) | 85.5% | 9.5% | 5% | 28 mg | 21 ± 9, 100% | 3 ± 8, 100% |
| No additive More carbon paint on can | 85.5% | 9.5% | 5% | 40 mg | 19 ± 2, 95% | 19 ± 2, 633% |
| 3% Na$_2$SiO$_3$ | 79.6% | 12.8% | 4.6% | 28 mg | 39 ± 1, 186% | 41 ± 3, 1367% |
| 7% carbon paint | 79.6% | 8.8% | 4.6% | 28 mg | 42 ± 4, 200% | 48 ± 6, 1600% |

TABLE 3

| Cathode Variations | CFx % | AB % | T % | CP Wt on the Can | Cathode Density | Initial | After 24 hr 110° C. |
|---|---|---|---|---|---|---|---|
| No Additive Higher Density Lower CFx/AB Ratio | 79.6% | 15.4% | 5 | 28 mg | 1.37 | 45 ± 8, 214% | 12 ± 12, 400% |
| With 3% K2SiO3 | 79.6% | 12.4% | 5 | 28 mg | 1.37 | 47 ± 5, 224% | 36 ± 4, 1200% |
| With 1% K2SiO3 | 79.6% | 14.4% | 5 | 28 mg | 1.37 | 54 ± 9, 257% | 45 ± 11, 1500% |

We claim:

1. An electrochemical cell comprising an anode, a cathode, a separator deposed between the anode and the cathode, and a non-aqueous electrolyte, the cell including a cell can which includes an interior surface which contains the cathode material and is in conductive contact therewith, the cell can interior having conductively attached thereto and disposed thereon so as to be in contact with the cathode material, a current collector, the cell further including on the surface of the current collector and the adjacent interior surface of the cell can, a coating comprising carbon powder.

2. The electrochemical cell of claim 1 wherein the anode comprises a Group I-A, Group Il-A or Group Ill-A metal.

3. The electrochemical cell of claim 1 wherein the anode is selected from the group consisting of lithium, lithium alloys and mixtures thereof.

4. A cell of claim 1 wherein the cathode comprises $CF_x$.

5. A cell of claim 4 wherein the cathode includes a binder.

6. A cell of claim 5 wherein the binder comprises a fluoropolymer.

7. A cell of claim 6 wherein the binder comprises T-30.

8. A cell of claim 1 wherein the cathode includes a conductivity enhancer.

9. A cell of claim 8 wherein the conductivity enhancer comprises acetylene black.

10. A cell according to claim 1 wherein the carbon paint includes a binder.

11. A cell according to claim 10 wherein the binder is selected from the group consisting of sodium silicate and potassium silicate.

12. A cell according to claim 1 wherein the cathode comprises an agent for counteracting an increase in internal impedance during short term high temperature storage and improving low temperature high-rate pulse performance of a cell.

13. A cell according to claim 12 wherein the agent is a silicate selected from the group consisting of a silicate of an alkali metal and a silicate of an alkaline earth metal.

14. A cell according to claim 13 wherein the silicate is selected from the group consisting of a sodium silicate, a potassium silicate, a lithium silicate and an aluminum silicate.

15. An electrochemical cell comprising an anode, a cathode, a separator deposed between the anode and the cathode, and a non-aqueous electrolyte, the cell including a cell can which includes an interior surface which contains the cathode material and is in conductive contact therewith, the cell can interior having conductively attached thereto and disposed thereon so as to be in contact with the cathode material, a current collector, the cell further including on the surface of the current collector and the adjacent interior surface of the cell can, a coating comprising carbon powder, the cathode material comprising a fluoropolymer and an agent for counteracting an increase in internal impedance during short term high temperature storage and improving low temperature high-rate pulse performance of a cell.

16. A method of making an alkali metal/$CF_x$ electrochemical cell having a cup-shaped cathode-containing can, the can defining a substantially flat interior cathode-material contacting surface, the surface having conductively attached thereto a cathode current collector of substantially smaller surface area than said cathode-material contacting surface, the method comprising the steps of:

applying a mixture comprising powdered carbon and a volatile solvent to all or substantially all of the cathode-contacting interior surface of the current collector and of the cathode material contacting surface of the can;

removing the solvent to leave powdered carbon applied to the cathode material contacting surfaces of the current collector and the interior cathode can conductively applied thereto; and assembling the cell components to complete the electrochemical cell.

17. A method according to claim 16 wherein the solvent is removed by evaporation.

18. A method according to claim 16 wherein the mixture of powdered carbon and a solvent comprises graphite, water, and a binder.

19. A method according to claim 18 wherein the binder is selected from the group consisting of sodium silicate and potassium silicate.

* * * * *